(12) United States Patent
Fuller et al.

(10) Patent No.: US 12,049,182 B1
(45) Date of Patent: Jul. 30, 2024

(54) SYSTEMS, METHODS, AND DEVICES FOR CURRENT MONITORING AND POWER CONTROL

(71) Applicant: Altec Industries, Inc., Birmingham, AL (US)

(72) Inventors: David Bryon Fuller, Forest City, MO (US); Jesse L. Thompson, Shepherdsville, KY (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 18/372,373

(22) Filed: Sep. 25, 2023

(51) Int. Cl.
*H02J 7/00* (2006.01)
*B60R 16/033* (2006.01)
*B60R 16/04* (2006.01)

(52) U.S. Cl.
CPC ............ *B60R 16/033* (2013.01); *B60R 16/04* (2013.01); *H02J 7/00304* (2020.01); *H02J 7/0032* (2013.01); *H02J 7/0063* (2013.01); *H02J 2310/40* (2020.01); *H02J 2310/60* (2020.01)

(58) Field of Classification Search
CPC .... B60R 16/033; B60R 16/04; H02J 7/00304; H02J 7/0032; H02J 7/0063; H02J 2310/40; H02J 2310/60
USPC .................................................. 307/31, 10.1
See application file for complete search history.

(56) References Cited

U.S. PATENT DOCUMENTS

| | | | |
|---|---|---|---|
| 6,144,110 A * | 11/2000 | Matsuda | H02J 9/04 361/64 |
| 7,176,585 B2 | 2/2007 | Fehr | |
| 11,859,878 B2 * | 1/2024 | Lee | H01H 33/045 |
| 2003/0105567 A1 | 6/2003 | Koenig et al. | |
| 2006/0192663 A1 | 8/2006 | Bryan et al. | |
| 2013/0009465 A1 | 1/2013 | Bajjuri et al. | |
| 2015/0217640 A1 | 8/2015 | Bissontz | |
| 2018/0043846 A1 * | 2/2018 | Salter | H01R 24/38 |
| 2020/0114783 A1 | 4/2020 | Douglass | |
| 2020/0278936 A1 | 9/2020 | Gopalakrishnan et al. | |
| 2021/0170964 A1 * | 6/2021 | Vijithakumara | B60W 10/30 |
| 2022/0131372 A1 * | 4/2022 | Iliev | H02M 3/04 |
| 2023/0258483 A1 * | 8/2023 | Mohandas | G01K 1/024 702/104 |

FOREIGN PATENT DOCUMENTS

| | | |
|---|---|---|
| ES | 2820723 | 4/2021 |
| WO | 2019197459 A2 | 10/2019 |
| WO | 2020193466 A1 | 10/2020 |
| WO | 2020199928 A1 | 10/2020 |

* cited by examiner

*Primary Examiner* — Michael R. Fin
(74) *Attorney, Agent, or Firm* — Erise IP, P.A.

(57) ABSTRACT

Systems, methods, and devices for current monitoring and power control for utility vehicles are disclosed. A control device for directing current to utility vehicle auxiliary devices, such as an inverter and a front bumper winch, may be coupled to the utility vehicle battery. The control device may have an input terminal for coupling to the utility vehicle battery and one or more output terminals coupled to the utility vehicle auxiliary devices. The input terminal may receive current from the battery. The control device may control the flow of current to each of the output terminals. Sensors may detect the current flowing through the control device to detect if either a low current short or a high current short may occur, and corrective action may be taken in response to detecting an abnormal current.

20 Claims, 7 Drawing Sheets

SYSTEMS, METHODS, AND DEVICES FOR CURRENT MONITORING AND POWER CONTROL

BACKGROUND

1. Field

Embodiments of the present disclosure relate to power distribution. More specifically, embodiments relate to power distribution, current monitoring, and control systems for vehicles and battery-powered devices.

2. Related Art

Utility vehicles typically include auxiliary devices that are powered by a battery on the utility vehicle. For example, the auxiliary devices may include a front bumper winch, a DC hydraulic pump, and an inverter. To power the auxiliary devices, cables are used to connect the battery to the auxiliary device such that current can flow to the device. Fuses and solenoids are typically used to ensure safe operations of the auxiliary devices. However, due to the relatively large size of the solenoids, the solenoids are unable to be located at or in proximity to the battery. Thus, a cable must be run from the battery to the auxiliary device to accommodate the size of the solenoid. The cables are wired battery hot due to the high current from the battery and take up space in the utility vehicle. Furthermore, the cables are only protected by a fuse and, as such, lower current shorts are not detectable. Improvements in current monitoring and power control systems on utility vehicles is needed.

SUMMARY

Embodiments of the present disclosure solve the above-mentioned problems by providing systems, methods, and devices for current monitoring, power distribution, and control systems for utility vehicles and batteries. A utility vehicle may have one or more auxiliary devices that are powered using the utility vehicle battery. A control device may be directly coupled to the utility vehicle battery to receive current therefrom and control distribution of the current to one or more outputs. The one or more outputs in turn may be connected to one or more auxiliary devices. When the utility vehicle is turned off, the control device may disable the outputs after a predetermined time, such as 30 minutes. Thus, short circuits may be prevented when personnel are away from the utility vehicle. The control device (which may also be called a current monitoring or power distribution device) may monitor the current while the utility vehicle is on and take corrective actions in response to detecting an abnormality. For example, if a low current is detected at an output, the output may be disabled to prevent a low current short.

In some embodiments, the techniques described herein relate to a control device for a utility vehicle, including: a plurality of output terminals, each output terminal coupled to at least one auxiliary device and configured to deliver current to the at least one auxiliary device; a plurality of switches corresponding to the plurality of output terminals; an input terminal coupled to a battery of the utility vehicle, the input terminal configured to receive current from the battery and to distribute the current to each of the plurality of output terminals; and at least one processor configured to execute computer-executable instructions that, when executed, cause the control device to: responsive to receiving an external control signal, turn off each of the plurality of switches to disable current flow from the input terminal to the plurality of output terminals after a predetermined time, wherein the external control signal is generated responsive to the utility vehicle being turned off.

In some embodiments, the techniques described herein relate to a control device, wherein the input terminal is coupled to a positive terminal of the battery such that the positive terminal extends through the input terminal, thereby enabling additional components to be coupled to the positive terminal of the battery.

In some embodiments, the techniques described herein relate to a control device, wherein the at least one auxiliary device includes an inverter configured to charge one or more tools associated with the utility vehicle.

In some embodiments, the techniques described herein relate to a control device, wherein the at least one auxiliary device includes a first auxiliary device and a second auxiliary device, and wherein the output terminal is configured to direct current to one of the first auxiliary device or the second auxiliary device.

In some embodiments, the techniques described herein relate to a control device, wherein the output terminal directs current to the first auxiliary device or the second auxiliary device based on a received input signal generated at the utility vehicle.

In some embodiments, the techniques described herein relate to a control device, wherein the at least one processor executes further computer-executable instructions to: responsive to receiving an input signal to turn on the first auxiliary device while the second auxiliary device is on, disabling both the first auxiliary device and the second auxiliary device.

In some embodiments, the techniques described herein relate to a control device, wherein the at least one processor executes further executable instructions to: for each of the plurality of output terminals, responsive to detecting at least one of: a current above a first threshold, the current below a second threshold, an arc fault, or a ground fault, disabling the switch associated with the output terminal.

In some embodiments, the techniques described herein relate to a control device, further including a temperature sensor, wherein the at least one processor executes further instructions to: responsive to a detected temperature above a threshold temperature, disabling at least one of the plurality of switches.

In some embodiments, the techniques described herein relate to a method for power management on a utility vehicle, including: receiving current from a battery of the utility vehicle at an input terminal on a control device that is coupled to the battery; distributing the current from the input terminal to a plurality of output terminals, each output terminal coupled to at least one auxiliary device; monitoring, with one or more sensors of the control device, the current at each of the plurality of output terminals; responsive to receiving an external control signal, shutting off the distribution of power to the plurality of output terminals after a predetermined time, wherein the external control signal is generated responsive to the utility vehicle being turned off.

In some embodiments, the techniques described herein relate to a method, further including: responsive to detecting that the current at an output terminal is above a threshold current, turning off a switch on the control device associated with the output terminal.

In some embodiments, the techniques described herein relate to a method, wherein the input terminal is coupled to a positive terminal on the battery.

In some embodiments, the techniques described herein relate to a method, further including: receiving a control signal to operate a first auxiliary device coupled to an output terminal and that is in an off state; and responsive to receiving the control signal, turning on a switch associated with the output terminal to direct current to the first auxiliary device.

In some embodiments, the techniques described herein relate to a method, further including: receiving a second control signal to operate a second auxiliary device coupled to the output terminal; and responsive to receiving the second control signal, disabling the current to the first auxiliary device and directing current to the second auxiliary device.

In some embodiments, the techniques described herein relate to a system for power control, including: a power source; a power control device coupled to the power source, the power control device including: an input terminal coupled to the power source; a plurality of output terminals, each output terminal coupled to at least one auxiliary device; a plurality of switches corresponding to the plurality of output terminals; and at least one processor configured to execute computer-executable instructions that, when executed, cause the power control device to: responsive to receiving an external control signal, power the at least one auxiliary device for a predetermined time; and responsive to the predetermined time elapsing, removing the power to the at least one auxiliary device.

In some embodiments, the techniques described herein relate to a system, wherein the power source is a battery on a vehicle, wherein the input terminal of the power control device is coupled to a positive terminal on the battery.

In some embodiments, the techniques described herein relate to a system, wherein the power control device further includes: a first controller area network communicatively coupling the power control device to a second controller area network associated with the vehicle.

In some embodiments, the techniques described herein relate to a system, wherein the at least one processor executes further executable instructions to: responsive to detecting a current value outside an acceptable current value range, communicating an alert to the second controller area network indicative of the current value outside the acceptable current value range.

In some embodiments, the techniques described herein relate to a system, further including: an additional current monitoring device coupled to an output terminal of the plurality of output terminals.

In some embodiments, the techniques described herein relate to a system, wherein the computer-executable instructions further include: monitoring a performance of the additional current monitoring device; and adjusting operations of the additional current monitoring device based on the performance.

In some embodiments, the techniques described herein relate to a system, wherein the computer-executable instructions further include: limiting power from the control device to the at least one auxiliary device based on a determined power need for the at least one auxiliary device.

This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 1:
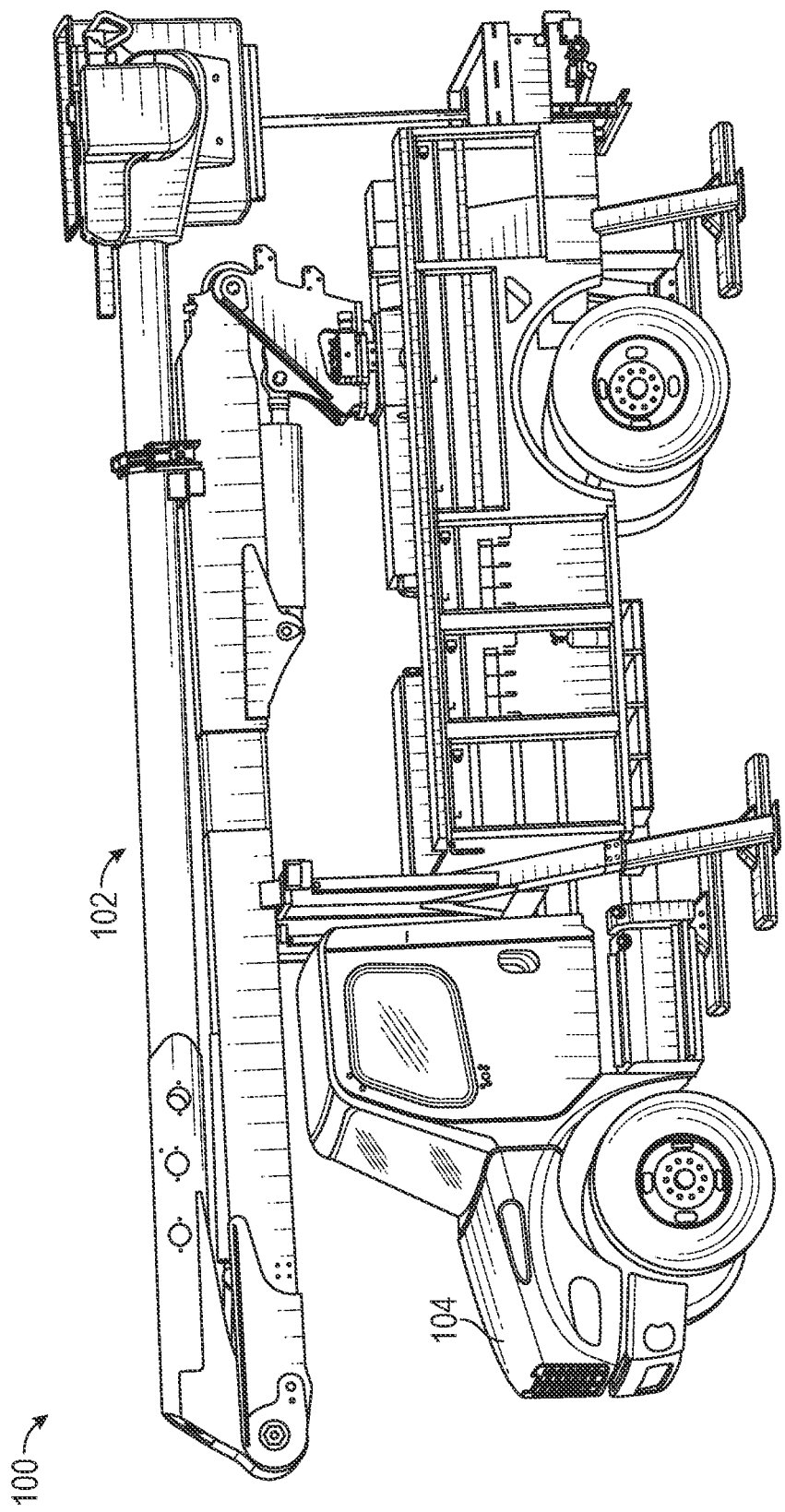
FIG. 1 illustrates a utility vehicle for some embodiments.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Utility Vehicle

FIG. 1 illustrates an exemplary utility vehicle 100 in accordance with embodiments of the present disclosure. The utility vehicle 100 may be any type of vehicle, such as a truck, and may transport powered components to a worksite for performing work operations. For example, the utility vehicle 100 may support a hydraulically powered aerial device 102, which may comprise a telescoping or articulating boom, and the utility vehicle 100 may be driven to a worksite and the aerial device 102 may be raised to provide a worker access to a remote location, such as a utility pole, for power line maintenance. Utility vehicle 100 may support or be coupled to other machines such as a digger derrick, a crane, a cable drum, or the like. Utility vehicle 100 may be an electric vehicle, an autonomous vehicle, or any other type of vehicle (e.g., aircraft, spacecraft, seacraft, etc.) or machine on which a battery (or other power source) is used to power other components.

In some embodiments, current from a battery of utility vehicle 100, which may be located under the hood 104 of utility vehicle 100 or elsewhere on utility vehicle 100, is used to power auxiliary device components of the utility vehicle 100. The auxiliary devices may include, for example, an inverter, a hydraulic pump, a power distribution module, a winch, or any other powered component. In some embodiments, when utility vehicle 100 is turned off, utility vehicle 100 is configured to provide power to at least one auxiliary device for an additional length of time before shutting off power to the auxiliary device. For example, utility vehicle 100 may power an inverter for 30 minutes after utility vehicle 100 is turned off. The inverter, in turn, may be used to charge power tools, for example, that may be used by workers. Utility vehicle 100 may be turned off at the end of a workday. Because the power tools will have their battery drained at the end of the workday, it is desirable to recharge the batteries for the next workday without requiring a worker to remain at the worksite while the power tools are recharged. As discussed in further detail below, embodiments of the present disclosure enable this safe operation by providing a control device that may be directly coupled to the vehicle battery and controls the distribution of current to auxiliary devices. The control device may operate on a timer to disable the distribution of current to the auxiliary devices after a period of time elapses.

System Diagram

Figure 2:
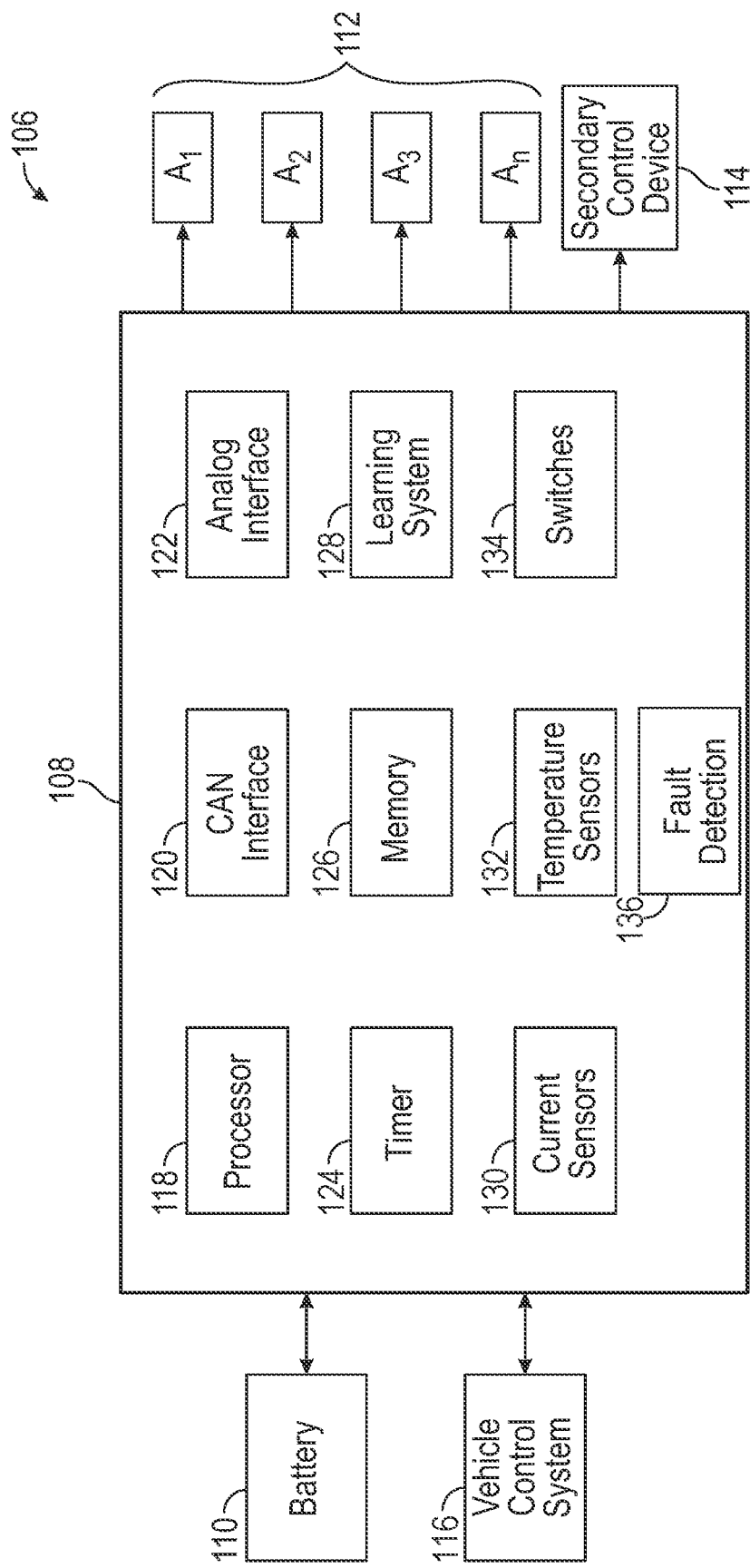
FIG. 2 illustrates a block diagram for some embodiments.

FIG. 2 illustrates a block diagram of a system 106 in accordance with embodiments of the present disclosure. System 106 may be used for current monitoring, power distribution and electric fault prevention for utility vehicles, which may enable high current applications (e.g., greater than 100 Amps or greater than 200 Amps), such as running an inverter to charge power tools, to be carried out on a utility vehicle 100 while the utility vehicle 100 is "unmanned," i.e., personnel are not in proximity to the utility vehicle to respond to a failure (e.g., short circuit) in the high current application. System 106 may also perform current monitoring and control, arc fault detection, ground fault detection, or any combination thereof while the utility vehicle 100 is manned to prevent faults and to provide current to an auxiliary device based on input from an operator. While discussed with respect to high current applications, it is contemplated that control device 108 may similarly be used for high voltage applications without departing from the scope hereof.

Figure 4:
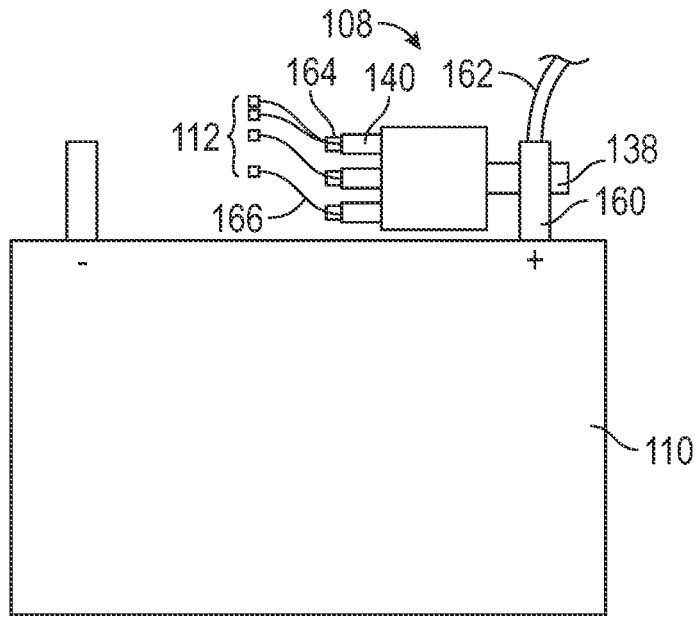
FIG. 4 illustrates the control device coupled to a battery for some embodiments.

System 106 may comprise a control device 108 configured to receive current from a battery 110, such as a battery on utility vehicle 100, and distribute the current to one or more auxiliary devices 112 ($A_1$, $A_2$, $A_3$, ... $A_n$). As shown in FIG. 4 below, control device 108 may be directly coupled to a positive terminal of battery 110 to receive current therefrom. Directly coupling control device 108 to battery 110 in this way is advantageous by eliminating the need for an additional wire to connect battery 110 to control device 108, which can save space and reduce the number of wires that operate at high heat and may represent a potential fault. However, it will be appreciated that any method of coupling control device 108 to battery 110 is within the scope of the present disclosure. For example, control device 108 may be mounted in a location remote from battery 110 and coupled thereto via a cable, a busbar, or the like to receive power from battery 110. The control device 108 may then deliver current to the auxiliary devices 112, which may be located elsewhere on utility vehicle 100 and connected to the control device 108 via cables, for example, or any other wiring. The auxiliary devices 112 may be powered components of utility vehicle 100, such as an inverter and a front bumper winch as previously discussed. In some embodiments, the auxiliary device 112 is a secondary control device 114. The secondary control device 114 may be a smaller version (e.g., may be rated for less current) of the primary control device 108. The secondary control device 114 may then be coupled to and direct current to other auxiliary devices 112.

In some embodiments, control device 108 comprises an input terminal and three output terminals (see FIGS. 3A-3C) and current may be split from an input of control device 108 (coupled to battery 110) to each of the three outputs. For example, control device 108 may receive an input current of 1000 A and each output terminal may deliver an output current of 300 A. In some embodiments, the output terminals are each rated for the same maximum current, or the output terminals may have different maximum current ratings. Each output may be coupled to one or more auxiliary devices 112 as previously mentioned. When an output terminal is connected to more than one auxiliary device 112, control device 108 may control the flow of current to one auxiliary device 112 at a single time, to all auxiliary devices at a single time, or to a subset of the auxiliary devices 112 at a single time. While embodiments of the present disclosure are generally discussed with respect to control device 108 having three output terminals, control device 108 may have fewer or greater output terminals without departing from the scope hereof.

Along with directing current to the auxiliary devices 112, the control device 108 may monitor the current and adjust operations based on the current. For example, if a current value at an output below a threshold current value is detected, control device 108 may shut off the flow of the current to the output to prevent a low current short. Similarly, a detected current value above a threshold current value may cause control device 108 to shut off the flow of the current to prevent a high current short. In some embodiments, control device 108 is communicatively coupled to a vehicle control system 116, which may include a telematics system. Operational data of control device 108 may be communicated to the telematics system. If an abnormal operating event is detected, the telematics system may cause an alert to be sent indicative of the abnormal operating event. For example, the current detection outside of an acceptable current range may be communicated to the telematics system of vehicle control system 116, which may then communicate an alert to an operator associated with the vehicle. For example, the telematics system may alert the operator that a component needs to be replaced based on the abnormal current detected. Various other operational data may be communicated to vehicle control system 116 as discussed in further detail below.

Along with the input and output terminals, control device 108 may comprise a processor 118 (which may include one or more processors, a multiprocessor, a microprocessor, a combination thereof, or the like), a CAN (Controller Area Network) interface 120, an analog interface 122, a timer 124, memory 126, a learning system 128, current sensors 130, temperature sensors 132, switches 134, or any combination thereof. Processor 118 may be configured to execute computer-executable instructions that cause control device 108 to carry out one or more actions discussed herein. In some embodiments, memory 126 stores the software instructions for control device 108 that are executable by processor 118. Memory 126 may be any form of memory, such as those discussed below with respect to FIG. 6. In some embodiments, processor 118 is communicatively coupled to a vehicle control system 116 (e.g., the vehicle CAN) of utility vehicle 100, and processor 118 controls operations of control device 108 based on instructions received from vehicle control system 116. In some embodiments, processor 118 both executes computer-executable instructions for controlling operations of control device 108 and operates based on instructions received from vehicle control system 116.

Figure 3A:
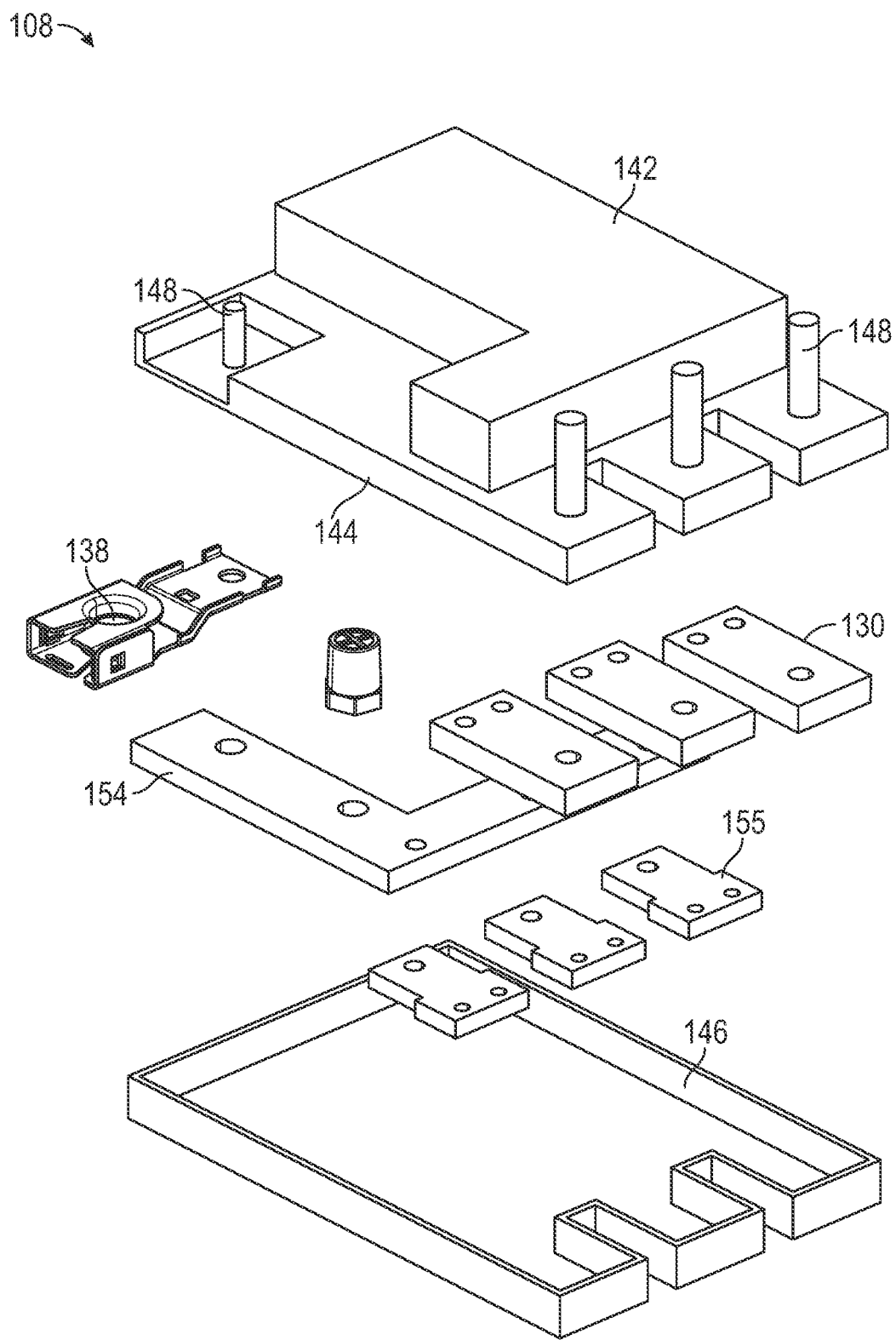
FIGS. 3A-3C illustrate a control device for some embodiments.
Figure 3B:
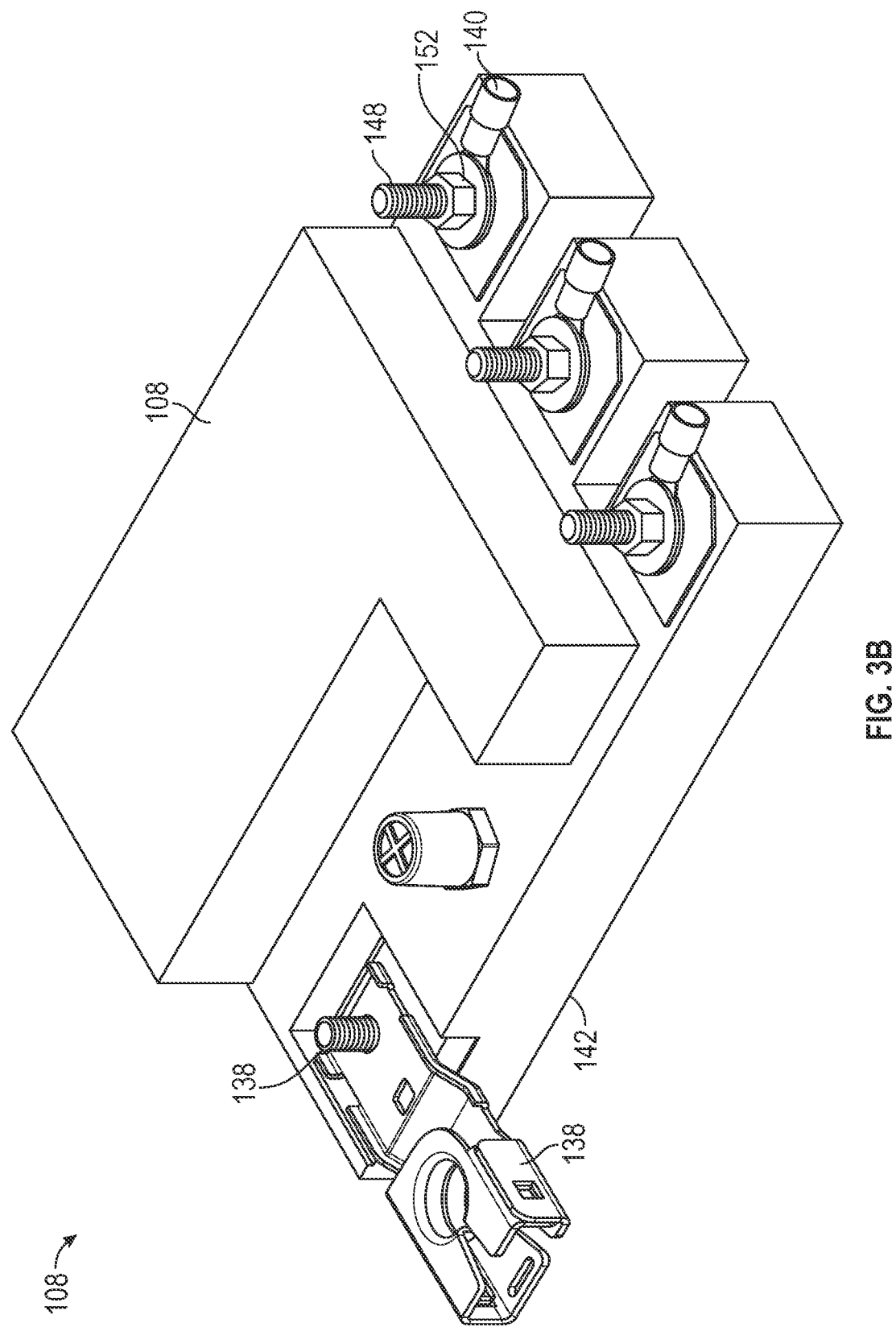
Figure 3C:
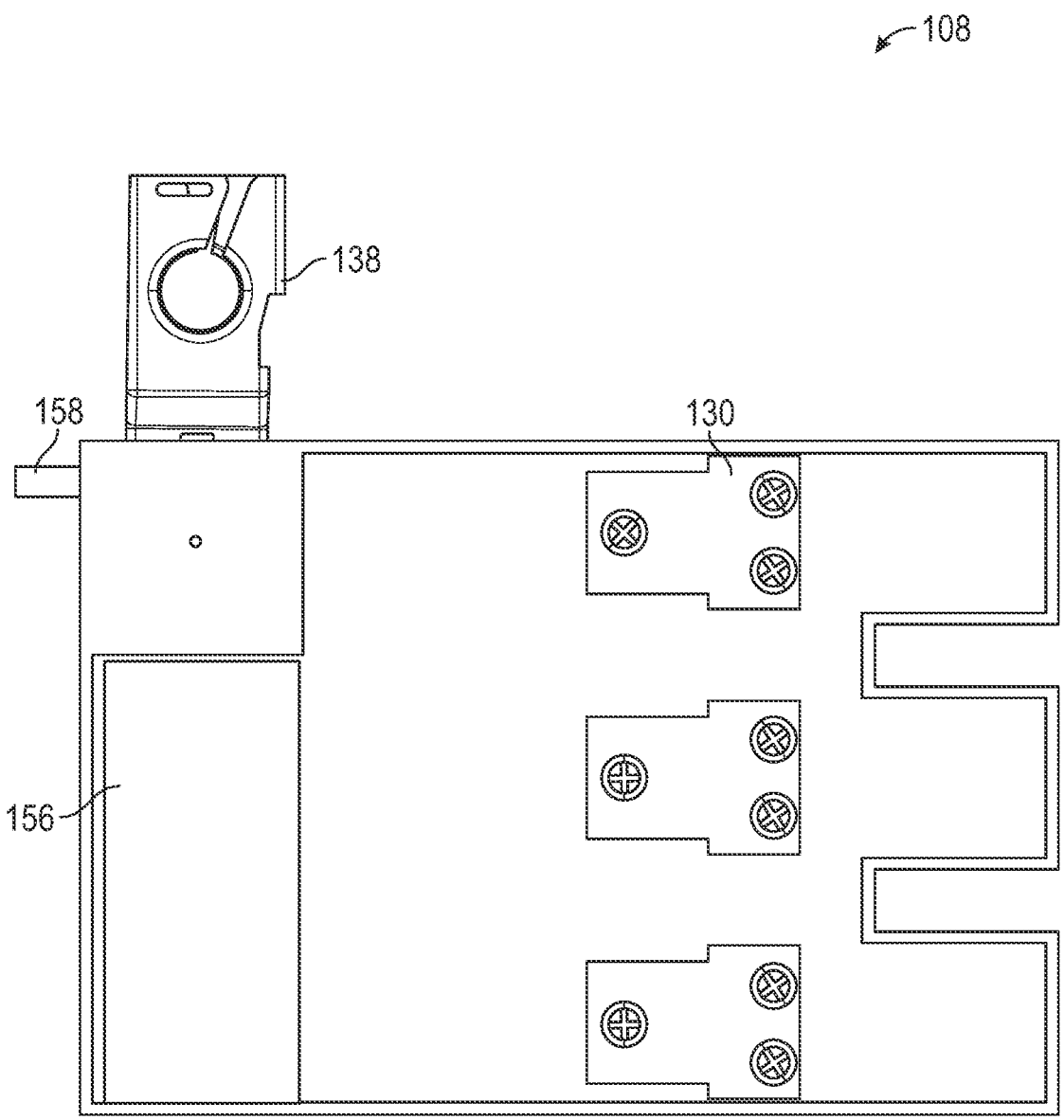

As shown in FIGS. 3A-3C below, each output terminal may have one or more switches 134 associated therewith, and processor 118 may control the state of the switches to allow or prevent current to flow to each output terminal. In some embodiments, a pair of switches 134 is associated with each output terminal, as discussed in further detail below. Providing switches 134 to control the flow of current to auxiliary devices 112 can reduce the number of cables that run at high temperatures due to the current flowing through the cables because the current can be prevented from flowing through the cables when the associated switch 134 is turned off. Further still, the use of switches 134 may prevent faults from occurring as the output terminals can be turned off before the fault occurs if an indication that a fault may occur is detected.

CAN interface 120 and/or analog interface 122 may be used for communications with utility vehicle 100 (e.g., vehicle control system 116) and/or communications with other components (e.g., switches 134) of control device 108. For example, an instruction from processor 118 to turn a switch 134 on or off may be communicated over an interface 120, 122. In some embodiments, control device 108 comprises a single interface 120, 122. In some embodiments, control device 108 wirelessly communicates with utility vehicle 100. For example, along with sensor data and instructions transferred to/from vehicle control system 116 and control device 108, it is contemplated that software updates and/or other data may be transmitted wirelessly to control device 108.

In some embodiments, vehicle control system 116 communicates inputs made by a vehicle operator to control device 108. For example, if the vehicle operator turns on an auxiliary device 112, vehicle control system 116 may transmit a control signal to processor 118 indicating that auxiliary device 112 was turned on to control device 108 such that control device 108 can ensure that current is directed to the auxiliary device 112. The control signal may indicate the auxiliary device 112 that current should be directed to and/or the output terminal that current should be directed to.

Another input that may be communicated by vehicle control system 116 is the indication that utility vehicle 100 is in the unmanned state. In some embodiments, the unmanned state is indicated by the utility vehicle 100 being shut off (e.g., a key being removed from an ignition switch or turned off via a push button start, etc.). The indication of the unmanned state may be communicated by vehicle control system 116 and cause processor 118 to initiate a shutdown sequence for control device 108. In some embodiments, the shutdown sequence comprises switching off each switch 134. In some embodiments, the shutdown sequence comprises continuing operations of control device 108 for an amount of time (which may be preset or set by the operator upon turning the utility vehicle 100 off) and then disabling control device 108 after the time elapses. The time may be measured and/or a shutdown time may be set by timer 124. In some embodiments, a single auxiliary device 112 is allowed to remain on while control device 108 is on and in the shutdown sequence. Thus, other auxiliary devices 112 may be turned off. For example, an inverter auxiliary device 112 may be left on for 30 minutes after shut down to charge power tools used during the workday. Because of the current monitoring performed by control device 108, it can be ensured that safe operations of control device 108 may proceed while utility vehicle 100 is unmanned with eliminated or reduced risk of a short or other harmful event when no personnel are around utility vehicle 100 to respond to such an event.

In some embodiments, control device 108 is configured to perform load shedding. For example, when two auxiliary devices 112 are coupled to the same output on control device 108, processor 118 may load shed to one of the two auxiliary devices 112. In some embodiments, auxiliary devices 112 are assigned a priority level such that if two or more auxiliary devices 112 that are connected to the same output terminal are turned on by the vehicle operator, control device 108 load sheds the lower priority auxiliary devices 112. The priority may be a parameter configurable by the vehicle operator, for example. In some embodiments, if two or more auxiliary devices 112 connected to the same output terminal are turned on at the same time, control device 108 is configured to shut off both auxiliary devices 112 to prevent current flowing to both auxiliary devices 112. Thereafter, the vehicle operator may select one of the two auxiliary devices 112 to turn on. Thus, in some embodiments, only a single auxiliary device 112 connected to an output terminal is powered at a time.

As previously discussed, vehicle control system 116 may control the operations of control device 108. Accordingly, load shedding may also occur based on a command issued from vehicle control system 116. For example, if vehicle control system 116 detects a low voltage at battery 110, such as a voltage below a threshold number, vehicle control system 116 may recognize the low voltage as an indication that the battery 110 may soon die. Accordingly, to avoid draining the battery 110 such that utility vehicle 100 is unable to start, control device 108 may turn off each switch 134 to conserve current and to ensure that battery 110 can start. As another example, an auxiliary device 112 may be designated as an emergency auxiliary device 112, and if a low voltage at battery 110 is detected switches 134 for other auxiliary device 112 may be turned off to ensure that the emergency auxiliary device 112 can be powered. The indication of which auxiliary device 112 is connected to which output terminals 140 may be hardwired into control device 108, programmed into processor 118 or vehicle control system 116, or both, or via any other method.

Timer 124 may include a clock, a timer, or both for enabling timed operations of control device 108 such that control device 108 can perform an action after a predetermined time has elapsed or at a specified time. For example, processor 118 may be configured to turn a switch on or off at a certain time to power on or off a corresponding auxiliary device 112 at a certain time. Thus, auxiliary devices 112 may be scheduled to turn on and off at times set by the vehicle operator or another user. As another example, when utility vehicle 100 enters the unmanned state, timer 124 may automatically begin a countdown upon the end of which control device 108 shuts off.

Learning system 128 may be a machine learning model, an artificial intelligence system, or the like configured to learn various parameters of control device 108 and components associated therewith to adjust the operations of control device 108 based on the learned parameters. For example, over time, learning system 128 may learn that an auxiliary device 112 requires a first amount of current to be turned on and a second amount of current to be maintained in the on state. Thus, if the current supplied to the auxiliary device 112 does not meet either or both of the currents at some point in time, control device 108 may recognize this as an abnormal operating condition and may alert the telematics system or take another corrective action. For example, the detection of a potential electrical fault may be communicated via a warning light on utility vehicle 100.

In some embodiments, an operator can input parameters for each auxiliary device 112, such as the current necessary to turn on and maintain each auxiliary device 112 in the on state, which may be stored in memory 126. In some embodiments, the parameters can be factory set. Thresholding may be used to allow deviation from an expected value before an alert is generated. In some embodiments, control device 108 is both preprogrammed with operating condition parameters and learning system 128 learns the parameters over time, which may be advantageous as the performance of utility vehicle 100, control device 108, auxiliary devices 112, or any combination thereof may change over time. Additionally, updates to parameters may be communicated to control device 108 wirelessly.

In some embodiments, power limits for one or more auxiliary devices 112 may be set. In some embodiments, modes can be assigned for an auxiliary device 112, such as a low power mode and a high-power mode. For example, a winch auxiliary device 112 could have a low current or voltage mode to limit the pulling power or speed of the winch. Similarly, a high current or voltage mode could be defined for when it is desired to operate the winch at full power and/or speed. Accordingly, control device 108 may adjust the current delivered to the output that the winch is receiving current from based on the power mode of the winch. In some embodiments, along with defining the parameters for the modes (e.g., what current should be supplied when in the full power mode), the operator may also input the mode that the auxiliary device 112 operates in, which may be used by control device 108 when directing current to the auxiliary device 112. Thus, the power provided from control device 108 may be limited based on a power mode or determined power need for the auxiliary device 112. Power modes may likewise be configured for a secondary control device 114. In some embodiments, auxiliary devices 112 are limited to operating in a low or reduced power mode while the utility vehicle 100 is in the unmanned state.

In some embodiments, learning system 128 generates and/or stores a current profile for control device 108 and/or auxiliary device 112. For example, the current profile for an auxiliary device 112 may indicate a first current range that causes auxiliary device 112 to turn on and a second current range that maintains the auxiliary device 112 in the on state. Accordingly, deviations from this current profile may be an indication that a fault may soon occur or that a part needs to be replaced or repaired, for example. As the components age, the current profile may change. Accordingly, the performance of auxiliary devices 112 may be monitored over time and, if the performance indicates that an auxiliary device 112 is malfunctioning and/or nearing the end of useful life, an alert may be generated, or other corrective action may be taken. In some embodiments, the detection that an auxiliary device 112 is nearing or has reached the end of useful life is based on the current drawn by the auxiliary device. Thus, detection of when parts need to be repaired and/or replaced may be enabled by monitoring the current and/or other performance parameters (e.g., voltage, etc.) over time.

Current sensors 130 may be configured to detect current in control device 108. The current sensors current sensors 130 may be located with or proximate to switches 134, along a bus bar (discussed further below), on a circuit board trace, or the like. Generally, the current sensors 130 may be located anywhere along the path from the input terminal to the auxiliary devices 112. In some embodiments, each output terminal has at least one current sensor 130 configured to detect the current being sent to that output terminal. In some embodiments, a current sensor 130 detects current being transmitted to each auxiliary device 112. A current sensor 130 may also measure current received from battery 110. Current sensors 130 may be communicatively coupled to processor 118 (e.g., via interfaces 120, 122) to communicate current data to the processor 118.

As previously discussed, the detected current values may be used to adjust the operations of control device 108. For example, if a high current is detected at an output terminal (e.g., a current above a threshold value), control device 108 may disable the switch 134 for the output terminal as the high current may be indicative of a potential high current short. Likewise, if a low current is seen at an output terminal (e.g., a current below a threshold value), control device 108 may disable the switch 134 for the output terminal as the low current may be indicative of a low current short. The use of current sensors 130 in control device 108 is advantageous as low current shorts may be detected and prevented as opposed to only using fuses that can only protect against high current shorts. In some embodiments, voltage sensors are used instead of, or in addition to, current sensors 130. Thus, in some embodiments, voltage thresholds are used to control the operations of control device 108.

Temperature sensors 132 may include one or more temperature sensors for monitoring the temperature of control device 108. The temperature sensors 132 may be communicatively coupled to processor 118. In some embodiments, processor 118 is configured to disable current distribution to the output terminals responsive to temperature sensors 132 detecting a temperature above (or below) a threshold temperature value. Thus, overheating of control device 108 may be prevented. The temperatures detected by temperature sensors 132 may also be used by processor 118 and/or vehicle control system 116 for determining if the current is outside of an acceptable range because the current curve will change as the temperature changes as will be appreciated by one of skill in the art.

Control device 108 may further include fault detection 136. Fault detection 136 may include sensors or other devices configured for detecting a fault. In some embodiments, each output comprises a fault detection sensor(s). In some embodiments, fault detection 136 is configured to detect arc faults and/or ground faults. Because arc faults are often associated with or precede shorts, it is advantageous to include arc fault detections to prevent shorts.

While control device 108 is discussed as being coupled to the vehicle battery 110, it is contemplated that control device 108 may be coupled to any other battery, power source, or power converter (e.g., a DC-DC converter on an electric vehicle) without departing from the scope hereof. Furthermore, the control device 108 may be directly or remotely connected (e.g., via a cable or busbar) to the power source. For example, a secondary battery may be disposed elsewhere on the chassis of utility vehicle 100 (or separately brought to the worksite) and a control device 108 could be coupled to the secondary battery for power control and current monitoring of auxiliary device 112 powered by the secondary battery in accordance with embodiments of the present disclosure. Furthermore, it is contemplated that the secondary battery could be charged by the alternator on utility vehicle 100. As with a control device 108 used on the vehicle battery 110, the use of control device 108 on a secondary battery can reduce the cable lengths required to connect the secondary battery to auxiliary devices 112 and reduce the number of cables or wires that run hot and may present a hazard due to the high current running through the cables or wires while enabling safe operations of auxiliary device 112 when personnel are away from utility vehicle 100.

Control Device

Turning now to FIGS. 3A-3C, control device 108 is illustrated in accordance with embodiments of the present disclosure. FIGS. 3A-3C are discussed collectively. FIG. 3A presents an exploded view of control device 108, FIG. 3B presents a perspective view of control device 108, and FIG. 3C presents a planar view of a bottom of a heat sink of control device 108.

As shown, control device 108 may comprise an input terminal 138 and one or more output terminals 140. Input terminal 138 may be coupled to battery 110 and deliver current to output terminals 140 that are connected auxiliary devices 112 and/or secondary control device 114 as previously discussed. The connection between output terminals 140 and auxiliary device 112 may be via a cable, for example. The cable may have a fuse (see FIG. 4) for further redundancy in the event of a fault, along with the fault protection provided by the current monitoring aspects of control device 108 discussed herein.

Control device 108 may comprise a housing formed by a heat sink 142, a middle enclosure 144, and a bottom enclosure 146. The heat sink 142 may be for heat management/dissipation of control device 108. The middle enclosure 144 may house various components of control device 108 (e.g., switches 134 and busbars, discussed below), and bottom enclosure 146 may enclose middle enclosure 144. In some embodiments, middle enclosure 144 is integral with heat sink 142. In some embodiments, heat sink 142 is formed from a metal, such as aluminum or stainless steel. In some embodiments, enclosures 144, 146 are formed from a plastic, such as a thermally insulating plastic. In some embodiments, enclosures 144, 146 are formed from a metal. Middle enclosure 144 may comprise studs 148 that project upwards towards heat sink 142 for coupling input terminal 138 and output terminals 140 to the housing. Studs 148 may be electrically insulating. Nuts 152 may be used to secure terminals 138, 140 to the housing. In some embodiments, an output terminal 140 is provided for each auxiliary device 112. Thus, two or more output terminals 140 may be connected to a stud 148. In some embodiments, a single output terminal 140 is connected to a stud 148, and multiple auxiliary devices 112 may be connected to the single output terminals 140. In some embodiments, nuts 152 are electrically insulating and studs 148 may be electrically conductive. While not shown in FIG. 3A, it will be appreciated that control device 108 may comprise various other fasteners (e.g., screws, bolts, weldments, etc.) for coupling heat sink 142, middle enclosure 144, and bottom enclosure 146 together, along with other securing components within and/or to the housing.

As previously discussed, switches 134 may be turned on and off by processor 118 to control the flow of current from input terminal 138 to output terminals 140. In some embodiments, switches 134 are MOSFETs (e.g., power MOSFETs). Relays may also be used for switching. Generally, any type of switch may be used. While not shown in FIGS. 3A-3C, it will be appreciated that switches 134 may be located appropriately in control device 108 to control the flow of current to the respective auxiliary device 112 controlled by the switch. In some embodiments, control device 108 comprises one or more switches 134 for each output terminal 140. In some embodiments, control device 108 comprises a pair of switches 134 for each output terminal 140. In some embodiments, a switch 134 is provided for each auxiliary device 112 that is connected to an output terminal 140. Thus, for example, if an output terminal 140 is coupled to two auxiliary devices 112, a first switch 134 for a first auxiliary device 112 and a second switch 134 for a second auxiliary device 112 may be provided, and processor 118 may individually turn the first and second switches 134 on and off to independently operate first auxiliary device 112 and second auxiliary device 112. For example, an operator of utility vehicle 100 may actuate an input element (e.g., a button on utility vehicle 100) to turn on the first auxiliary device 112, responsive to which processor 118 may turn the corresponding auxiliary device on, while leaving the second switch off. Thereafter, the operator may actuate another input element to turn on the second auxiliary device, responsive to which processor 118 turns off the first switch and turns on the second switch. As previously discussed, vehicle control system 116 may communicate control signals to processor 118 indicative of which output terminals 140 and/or switches 134 to enable.

As shown in FIGS. 3A and 3C, control device 108 may further comprise busbars to transfer current from input terminal 138 to output terminals 140. In some embodiments, control device 108 comprises one or more busbars 154, In some embodiments, a busbar 154 may be coupled to input terminal 138 to receive current therefrom and coupled to switches 134 (FIG. 3C) for each output terminal 140. Generally, any number and arrangement of busbars 154 for delivering current from input terminal 138 to output terminals 140 is within the scope hereof.

In some embodiments, control device 108 further comprises one or more shunts 155, which may be used for current monitoring and/or circuit protection. As shown, each output terminals 140 may be coupled to a first end of a shunt 155, and a second end of the shunt 155 may be connected to a current sensor 130. Each current sensor 130 may in turn be coupled to the busbar 154 at an end opposite where the current sensor 130 is coupled to the shunt 155.

Referring to FIG. 3C, it can be seen that control device 108 may comprise a PCB 156 on which processor 118, timer 124, memory 126, and other components may be located. In some embodiments, sensors 130, 132 are located on PCB 156. An interface 158, which may be a CAN interface 120 or an analog interface 122 is also shown. In some embodiments, control device 108 comprises both a CAN interface and an analog interface. The interface 158 may enable communications between processor 118 and switches 134 along with communications between processor 118 and the telematics system and vehicle control system 116. For example, operator input to switch power to an auxiliary device 112 may be communicated via an interface 120, 122 to processor 118, which may then adjust a corresponding switch 134. Inputs to adjust switches 134 may also be controlled via an input signal to a input wire associated with the auxiliary device 112, for example.

FIG. 4 schematically depicts how a control device 108 may be coupled to battery 110 in accordance with embodiments of the present disclosure. As shown, the input terminal 138 of control device 108 may be directly connected to the positive terminal 160 on battery 110. Utility vehicles 100 are often purchased from an OEM vehicle manufacturer that installs their own chassis wiring to battery 110 to provide power to other vehicle components, and then auxiliary devices 112 may be added by the vehicle purchaser. As such, it is one advantage of the present disclosure that control device 108 may be installed directly to battery 110 with little to no interference of the OEM wiring. That is, an OEM positive cable 162 that may be directly connected to positive terminal 160 on battery 110 by the manufacturer may be removed, and control device 108 may be coupled to positive terminal 160. Positive terminal 160 may extend upwards through input terminal 138 such that OEM positive cable 162 can be coupled back to the positive terminal 160. Other components may also be coupled to the positive terminal 160 because the terminal 160 extends upwards through the input terminal 138. Current from the battery 110 may then be distributed to both control device 108 and the OEM equipment. Accordingly, minimal changes to the OEM wiring of battery 110 may be achieved.

FIG. 4 also illustrates fuses 164 that may be used with output terminals 140 in the event of a short circuit. Fuses 164 may be bolt down fuses that are connected to studs 148, for example. Other types of fuses may be used. Cables 166 may extend to connect to auxiliary devices 112 that may be disposed elsewhere on the utility vehicle 100. In some embodiments, a single cable 166 is coupled to output terminal 140. In some embodiments, multiple output terminals 140 are coupled to a single stud 148, and a single cable 166 is coupled to each output terminal 140.

As mentioned previously, control device 108 may couple to one or more secondary control devices 114. The secondary control device 114 may be substantially similar to control device 108 but may be rated for less current than control device 108. The input current to secondary control device 114 may be the output current of secondary control device 114. Secondary control device 114 may then power other, lower current auxiliary devices 112 and may include the same current monitoring and control as discussed with respect to control device 108. For example, a secondary control device 114 may provide power to a halogen light and an oil cooling fan on utility vehicle 100. Control device 108 may be communicatively coupled to each secondary control device 114 coupled thereto. Thus, it is contemplated that a network of control devices 108, 114 could be used on a utility vehicle 100 to monitor and control the power distribution for devices that are powered by batteries or other power sources on the utility vehicle 100. Additionally, as previously discussed, control device 108 may be used on electric utility vehicles 100 where control device 108 may be coupled to a DC-DC converter on the electric utility vehicle 100.

Exemplary Method

Figure 5:
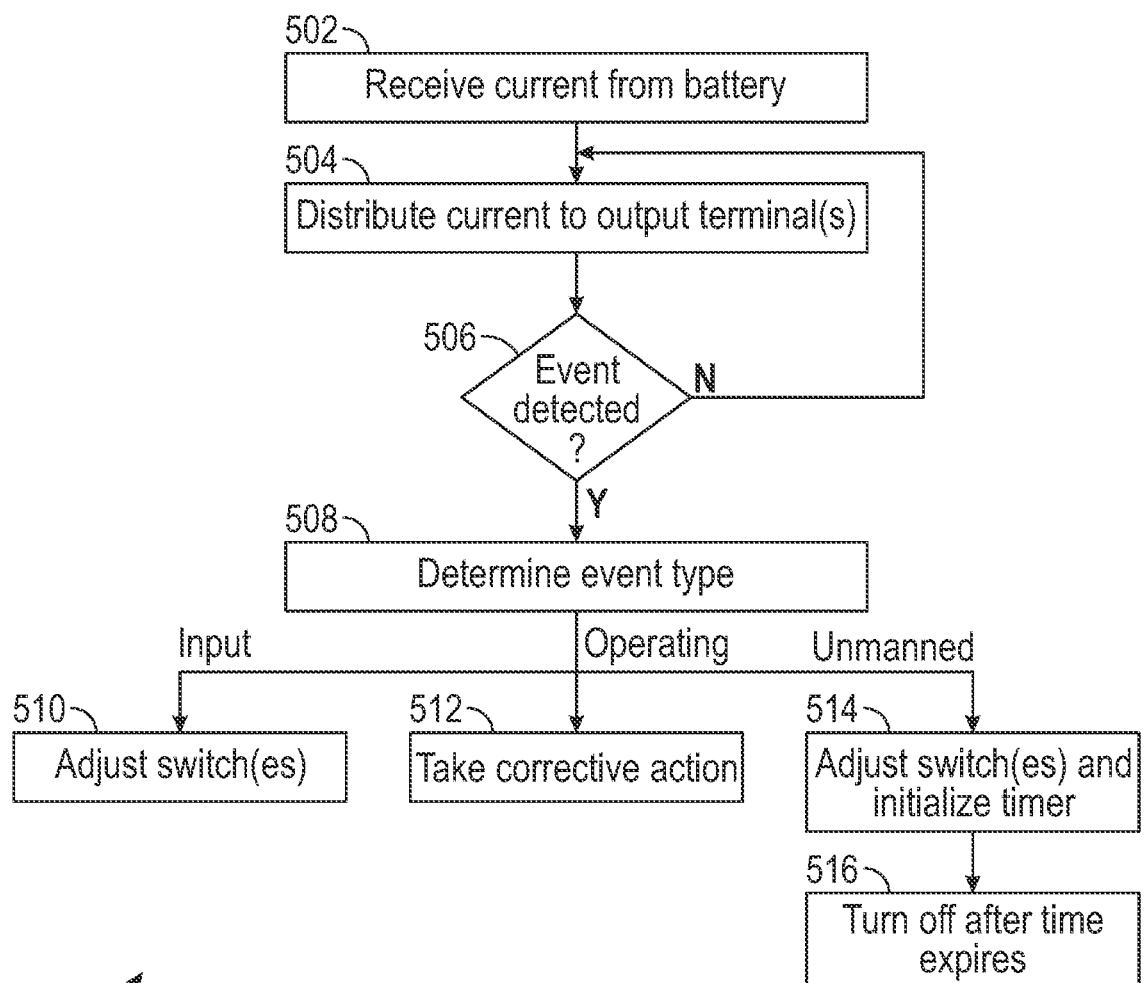
FIG. 5 illustrates an exemplary flow chart for some embodiments.

FIG. 5 illustrates an exemplary operational method 500 in accordance with embodiments of the present disclosure. Method 500 may begin at step 502 where control device 108 receives current from battery 110. As previously discussed, control device 108 may be coupled to a positive terminal 160 of battery 110 to draw power therefrom. By directly coupling control device 108 to battery 110, excess wire that would be required to connect battery 110 to control device 108 can be eliminated. Eliminating the excess wire can both save space and improve safety by removing a potential place where a short circuit may occur.

Next, at step 504, the current is distributed to one or more output terminals 140. Processor 118 may control the switches 134 to control the flow of current to each of the output terminals 140. In some embodiments, processor 118 adjusts the switches 134 based on a received external control signal, which may be received from vehicle control system 116, for example. For example, the operator of utility vehicle 100 may turn on an auxiliary device 112, which causes the generation of the external control signal that is communicated to processor 118 for turning on the corresponding switch 134 to provide current to the output terminal 140 that is connected to the auxiliary device 112.

Thereafter, processing may proceed to test 506, where it may be determined whether an event is detected. An event may be anything that causes a change in the operation of control device 108. If no event is detected, processing may return to step 504 where the current is continuously distributed to the output terminals 140. If an event is detected, processing may proceed to step 508 where an event type for the event may be determined. The event type may be one of an input event, an operating event, or an unmanned event in some embodiments. While three event types are discussed, it will be appreciated that the three events are exemplary, and that other events may cause a change in the operation of control device 108.

Processing may proceed from step 508 to step 510 when an input event is detected. An input event may be an event in which the utility vehicle operator provides an input to change the operation of an auxiliary device 112 connected to control device 108. For example, turning an auxiliary device 112 on or off may be an input event that causes processing to proceed to step 508 where one or more switches 134 are adjusted. The adjustment may comprise turning one or more switches on and off. Step 510 may also comprise adjusting which auxiliary device 112 coupled to a common output terminal 140 receives current. As another example, the input event may be the vehicle operating turning on a second auxiliary device 112 connected to a common output terminal 140 as a first auxiliary device 112 when the first auxiliary device 112 is already running, and adjusting the switches 134 may comprise turning off the switches 14 for the common output terminal as a safety measure to prevent current from being directed to both devices 112.

When an abnormal operating event is detected, processing may proceed from step 508 to step 512. The abnormal operating event may be a detected current that is above or below a threshold current value, a temperature value above or below a threshold temperature value, or any other event that indicates abnormal operations of control device 108 are occurring or may be likely to occur. At step 512, one or more corrective actions may be taken. In some embodiments, the corrective action comprises disabling control device 108 or disabling current to one or more of output terminals 140. For example, if a current value below a threshold current value is detected at the second output terminal 140, the switch 134 for the second output terminal 140 may be turned off. As another example, the abnormal operating event may be communicated to the telematics system for alerting the utility vehicle operator or another responsible party. In some embodiments, the corrective action comprises turning on a check engine light or initiating another warning for utility vehicle 100. One of skill in the art will appreciate that many corrective actions may be taken.

When an unmanned event occurs, processing may proceed from step 508 to step 514. The unmanned event may be the removal of a key from the ignition of utility vehicle 100 (or another shutting off of utility vehicle 100), which may indicate that the utility vehicle 100 is "unmanned" i.e., that no person is in proximity to utility vehicle 100 to take action in the event of a failure. In some embodiments, a vehicle operator can set a state of utility vehicle 100. In some embodiments, utility vehicle 100 is configured to detect when personnel are away from the utility vehicle 100 to set the unmanned state. For example, proximity detection or motion tracking may be used to determine if personnel are nearby or if personnel have not been detected near the utility vehicle 100 in a threshold time period.

At step 514, one or more switches 134 may be adjusted and a timer may be started. In some embodiments, control device 108 is configured to only power a single auxiliary device 112 while unmanned and for a predetermined time as previously discussed. Accordingly, the switches 134 for the not-in-use auxiliary devices 112 may be turned off. If the in-use auxiliary device 112 is off when utility vehicle 100 becomes unmanned, the in-use auxiliary device 112 may automatically be turned on. It is contemplated that utility vehicle 100 may be configured to automatically turn on an auxiliary device 112 (e.g., as specified by the operator of utility vehicle 100) when utility vehicle 100 is turned off. For example, each time utility vehicle 100 is turned off, an inverter may be turned on (if the inverter is not already on) and run for 30 minutes to power rechargeable tools. Thus, for example, at the end of the day, utility vehicle 100 may be turned off and the inverter can power the tools for use the next day. By providing control device 108, which can detect shorts before the shorts may occur and turn off auxiliary devices 112 after a predetermined time when utility vehicle 100 is unmanned, the operator of utility vehicle 100 may safely use auxiliary devices 112 without having to be in proximity to utility vehicle 100 to respond to a potential failure event, such as a short. Processing may proceed from step 514 to step 516 where the switch 134 for the in-use auxiliary device 112 is turned off after the time elapses.

It will be appreciated that while control device 108 operates in the unmanned mode at step 514, the monitoring aspects of control device 108 may still be employed. That is, control device 108 may continue to monitor for events (e.g., currents outside of an acceptable range, arc/ground faults, etc.), and control device 108 may take an action in response to the detection of the event. For example, if an operating event is detected, step 512 may be carried out (while control device 108 still operates in the unmanned state, in some embodiments) to take a corrective action responsive to the operating event. As another example, if an input event is detected, step 510 may be carried out. For example, the utility vehicle operator may turn the utility vehicle 100 back on, which may cause step 510 to occur to turn switches 134 back on for one or more auxiliary devices 112. Thus, it will be appreciated that control device 108 and/or vehicle control system 116 may continuously monitor for events while in operation, regardless of the state (e.g., manned or unmanned) being operated in.

Exemplary Hardware Platform

Figure 6:
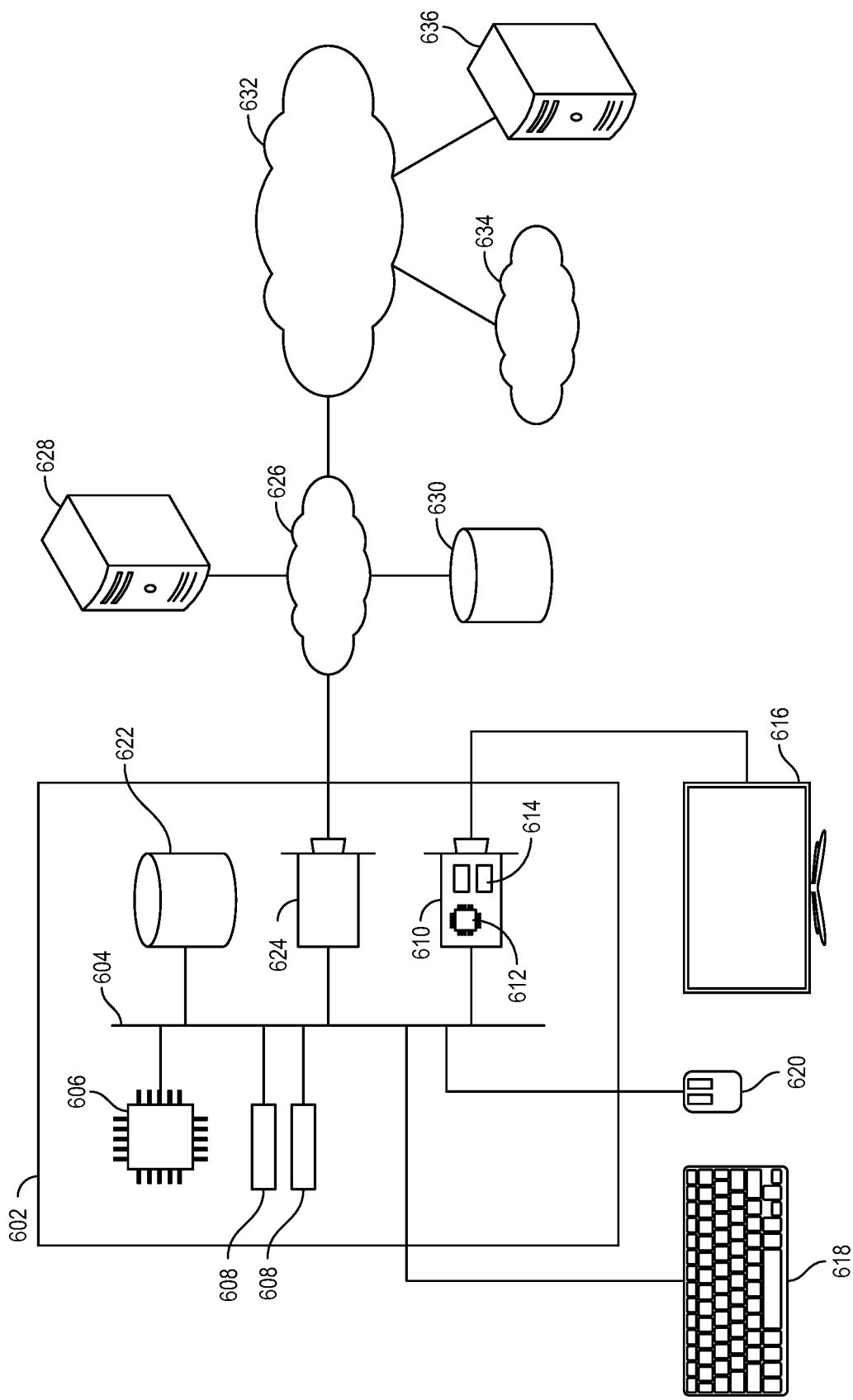
FIG. 6 illustrates an exemplary hardware platform for some embodiments.

In FIG. 6, an exemplary hardware platform for certain embodiments is depicted. Computer 602 can be a desktop computer, a laptop computer, a server computer, a mobile device such as a smartphone or tablet, or any other form factor of general- or special-purpose computing device. In some embodiments, computer 602 may be associated with a utility vehicle 100. Depicted with computer 602 are several components for illustrative purposes. In some embodiments, certain components may be arranged differently or absent. Additional components may also be present. Included in computer 602 is system bus 604, whereby other components of computer 602 can communicate with each other. In certain embodiments, there may be multiple buses or components may communicate with each other directly. Connected to system bus 604 is central processing unit (CPU) 606. Also attached to system bus 604 are one or more random-access memory (RAM) modules 608. Also attached to system bus 604 is graphics card 610. In some embodiments, graphics card 610 may not be a physically separate card but rather may be integrated into the motherboard or the CPU 606. In some embodiments, graphics card 610 has a separate graphics-processing unit (GPU) 612, which can be used for graphics processing or for general-purpose computing (GPGPU). Also on graphics card 610 is GPU memory 614. Connected (directly or indirectly) to graphics card 610 is display 616 for user interaction. In some embodiments, no display is present, while in others, it is integrated into computer 602. Similarly, peripherals such as keyboard 618 and mouse 620 are connected to system bus 604. Like display 616, these peripherals may be integrated into computer 602 or absent. Also connected to system bus 604 is local storage 622, which may be any form of computer-readable media and may be internally installed in computer 602 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical but transitory forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 624 is also attached to system bus 604 and allows computer 602 to communicate over a network such as local network 626. NIC 624 can be any form of network interface known in the art, such as Ethernet, ATM, fiber, Bluetooth, or Wi-Fi (i.e., the IEEE 602.11 family of standards). NIC 624 connects computer 602 to local network 626, which may also include one or more other computers, such as computer 628, and network storage, such as data store 630. Generally, a data store such as data store 630 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein, such as backup or versioning. Data stores can be local to a single computer such as computer 628, accessible on a local network such as local network 626, or remotely accessible over Internet 632. Local network 626 is, in turn, connected to Internet 632, which connects many networks such as local network 626, remote network 634, or directly attached computers such as computer 636. In some embodiments, computer 602 can itself be directly connected to Internet 632.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

1. A control device for a utility vehicle, comprising:
    a plurality of output terminals, each output terminal coupled to at least one auxiliary device and configured to deliver current to the at least one auxiliary device, wherein at least one output terminal is coupled to a first auxiliary device and a second auxiliary device and is configured to deliver current to either the first auxiliary device or the second auxiliary device;
    a plurality of switches corresponding to the plurality of output terminals;
    an input terminal coupled to a battery of the utility vehicle, the input terminal configured to receive current from the battery and to distribute the current to each of the plurality of output terminals; and
    at least one processor configured to execute computer-executable instructions that, when executed, cause the control device to:
        responsive to receiving an input signal to turn on the first auxiliary device while the second auxiliary device is on, disable both the first auxiliary device and the second auxiliary device;
        responsive to receiving an external control signal, turn off each of the plurality of switches to disable current flow from the input terminal to the plurality of output terminals after a predetermined time,
        wherein the external control signal is generated responsive to the utility vehicle being turned off.

2. The control device of claim 1, wherein the input terminal is coupled to a positive terminal of the battery such that the positive terminal extends through the input terminal, thereby enabling additional components to be coupled to the positive terminal of the battery.

3. The control device of claim 1, wherein the at least one auxiliary device comprises an inverter configured to charge one or more tools associated with the utility vehicle.

4. The control device of claim 1, wherein the at least one output terminal directs current to the first auxiliary device or the second auxiliary device based on a received input signal generated at the utility vehicle.

5. The control device of claim 1, wherein the at least one processor executes further executable instructions to:
    for each of the plurality of output terminals, responsive to detecting at least one of: a current above a first threshold, the current below a second threshold, an arc fault, or a ground fault, disabling the switch associated with the output terminal.

6. The control device of claim 1, further comprising a temperature sensor, wherein the at least one processor executes further instructions to:
    responsive to a detected temperature above a threshold temperature, disabling at least one of the plurality of switches.

7. A method for power management on a utility vehicle, comprising:
    receiving current from a battery of the utility vehicle at an input terminal on a control device that is coupled to the battery;
    distributing the current from the input terminal to a plurality of output terminals, each output terminal coupled to at least one auxiliary device;
    monitoring, with one or more sensors of the control device, the current at each of the plurality of output terminals;
    receiving a first control signal to operate a first auxiliary device that is coupled to an output terminal of the plurality of output terminals and is in an off state;
    responsive to receiving the first control signal, turning on a switch associated with the output terminal to direct current to the first auxiliary device;
    receiving a second control signal to operate a second auxiliary device coupled to the output terminal;
    responsive to receiving the second control signal, disabling the current to the first auxiliary device and directing current to the second auxiliary device; and
    responsive to receiving a third control signal, shutting off the distribution of power to the plurality of output terminals after a predetermined time,
    wherein the third control signal is generated responsive to the utility vehicle being turned off.

8. The method of claim 7, further comprising:
    responsive to detecting that the current at an output terminal is above a threshold current, turning off a switch on the control device associated with the output terminal.

9. The method of claim 7, wherein the input terminal is coupled to a positive terminal on the battery.

10. The method of claim 7, further comprising training a machine learning model to determine operating conditions of the at least one auxiliary device.

11. A system for power control, comprising:
    a power source;
    a power control device coupled to the power source, the power control device comprising:
        an input terminal coupled to the power source;
        a plurality of output terminals, each output terminal coupled to at least one auxiliary device,
        wherein at least one output terminal is coupled to a first auxiliary device and to a second auxiliary device and is configured to deliver current to either the first auxiliary device or the second auxiliary device;
        a plurality of switches corresponding to the plurality of output terminals; and
        at least one processor configured to execute computer-executable instructions that, when executed, cause the power control device to:
            responsive to receiving a first external control signal to power the first auxiliary device, power the first auxiliary device; and
            responsive to receiving a second external control signal to power the second auxiliary device while the first auxiliary device is on, disabling the current to the first auxiliary device and directing the current to the second auxiliary device;
            responsive to receiving a third external control signal, turn off at least a subset of the plurality of switches to disable current flow from the input terminal to the subset of the plurality of output terminals.

12. The system of claim 11, wherein the power source is a battery on a vehicle, wherein the input terminal of the power control device is coupled to a positive terminal on the battery.

13. The system of claim 12, wherein the power control device further comprises:
a first controller area network communicatively coupling the power control device to a second controller area network associated with the vehicle.

14. The system of claim 13, wherein the at least one processor executes further executable instructions to:
responsive to detecting a current value outside an acceptable current value range, communicating an alert to the second controller area network indicative of the current value outside the acceptable current value range.

15. The system of claim 11, wherein the power control device is a first power control device and further comprising:
a second power control device coupled to an output terminal of the plurality of output terminals.

16. The system of claim 15, wherein the computer-executable instructions further comprise:
monitoring a performance of the second power control device; and
adjusting operations of the second power control device based on the performance.

17. The system of claim 11, wherein the computer-executable instructions further comprise:
limiting power from the power control device to the first auxiliary device based on a determined power need for the first auxiliary device.

18. The system of claim 11, wherein the power source is a battery on a vehicle, and wherein the third external control signal is generated responsive to a detection of the vehicle being in an unmanned state.

19. The system of claim 18, wherein one output terminal is configured to remain powered on for a predetermined time responsive to the third external control signal being received.

20. The system of claim 11, wherein the at least one auxiliary device comprises at least one of a front bumper winch, a hydraulic pump, an inverter, or a secondary power control device.

* * * * *